Inventor
Carl J. Conkle
By Robert L. Zieg
Att'y.

United States Patent Office 3,452,614
Patented July 1, 1969

3,452,614
SHIFT LEVER MECHANISM WITH SHIFT RAIL
INTERLOCK AND STOP MEANS
Carl J. Conkle, Muncie, Ind., assignor to Borg-Warner
Corporation, Chicago, Ill., a corporation of Illinois
Filed June 5, 1967, Ser. No. 643,623
Int. Cl. G05g 9/02, 5/10
U.S. Cl. 74—477
8 Claims

ABSTRACT OF THE DISCLOSURE

A transmission mechanism includes a plurality of shift rails axially movable to selectively establish a plurality of gear ratios; interlock means between the shift rails acts to hold one of the shift rods in its neutral position when the other shift rail is moved to a ratio position; and stop shoulders formed on the shift rails are operative to engage said interlock means to limit the movement of either of the shift rails.

Summary of invention

In the manual transmission mechanisms known in the prior art it has been a general practice to provide a plurality of shift rods or rails axially slidable, each having a shift fork thereon and adapted to engage specific gear ratios when the shift fork is moved axially. Detent mechanisms are incorporated with the shift rails to provide a "feel" and to yieldably hold the shift rail in its various selected positions. Stop means are normally provided to limit the movement of the shift rail to prevent movement of the shift fork beyond that desired which could result in damage to the transmission.

In known prior art transmissions it has been a practice to provide machined stops on the shift forks which are engageable with machined stops within the transmission casing. Although these types of transmissions perform well, it is apparent that expensive machining is involved to maintain proper axial dimensions of parts involved. Further, machining on both the shift forks and on the transmission housing is necessary to provide the stops for the shift rails.

The present invention overcomes these objections by providing a stop mechanism built into the shift rail itself.

The invention comprises a transmission having a plurality of shift rails axially slidable to establish a plurality of gear ratios. An interlock mechanism actuatable by one of the shift rails moving from its neutral position to one of its ratio positions moves into engagement with the other shift rail and the groove provided therein to hold the other shift rail in a neutral position to prevent inadvertent shifting thereof and including a stop means provided on the shift rail adapted to engage the interlock means when the shift rail is moved axially the desired distance to engage the specific ratio.

Description of the drawings

Referring to FIGURES 1 and 2, the shift lever mechanism 10 of the present invention is illustrated. A portion of a transmission casing 11 is illustrated having a cover member 12 suitably secured thereto. The cover member 12 includes a dome 13 in which is mounted a shifting lever 14. The dome has a partially spherical surface 15 adapted to receive a ball 16 provided on the shift lever 14. A spring 18 engages the ball 16 and a portion 19 of the dome to urge the shift lever and ball into engagement with the spherical surface 15.

Slidably mounted within bores 20 and 21 within cover member 12 is a pair of axially slidable shift rails 22 and 23.

In general, as known in the prior art, the shift rails are adapted to be moved axially and individually by the shift lever 14 so that a gear ratio can be selected within the transmission gear mechanism generally indicated at 25.

Figure 1:
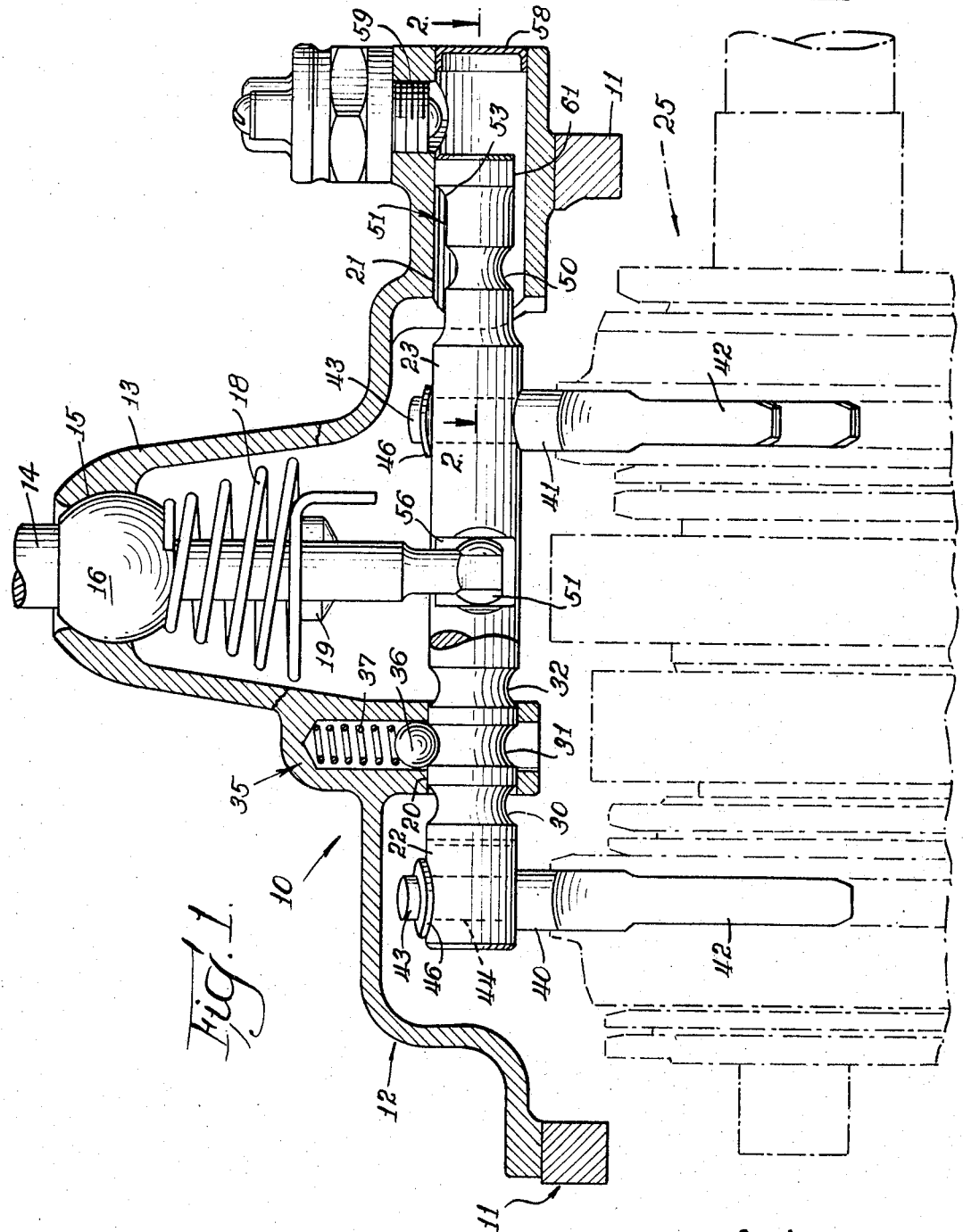
FIGURE 1 is a view partially in section of the improved shift lever mechanism.

Each of the shift rails 22 and 23 has three grooves 30, 31 and 32 thereon located to correspond with the neutral and two ratio establishing positions of each of the shift rods. As illustrated in FIGURE 1, groove 31 represents the neutral position, groove 30 represents a ratio position and groove 32 represents another ratio position. A detent mechanism 35 is provided comprising a ball 36 engageable with the grooves 30, 31 or 32 and a spring 37 is adapted to urge the ball into engagement with the grooves.

Mounted on the shift rail 22 is a shift fork 40 and a shift fork 41 provided on shift rail 23. The shift forks have semi-spherical forked portion 42 which engages a shift collar mechanism adapted to establish ratios within the main transmission mechanism generally indicated at 25. Also provided on the shift forks is a pin 43 which is received within a bore 44 in each of the shift rails. A locking washer or snapring 46 is provided which engages the pins 43 retaining the shift fork securely in the shaft rails.

At the right end of the shift rails 22 and 23 there is provided a locking groove 50 formed in a recessed portion 51, the recessed portion 51 forming on either side of the locking groove 50 a pair of shoulders 52 and 53. The shoulders 52, 53 are adapted to act as a stop mechanism for the shift rails as will be later described.

Each of the shift rails includes a slot 56 at the midportion thereof adapted to be engaged by a semi-spherical portion 57 on the end of shift lever 14 so that the rails may be selectively engaged and moved axially by the shift lever 14.

The bore 21 within cover member 12 is closed on the right end thereof by an end plug 58. A mechanically actuated backup switch 59 is shown adapted to be engaged by the shift rail 23 when it is moved to the right to establish reverse ratio, for example.

Figure 2:
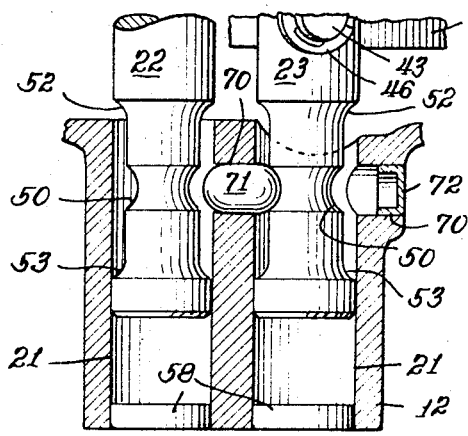
FIGURE 2 is a view sectionally taken along line 2—2 of FIGURE 1.
Figure 3:
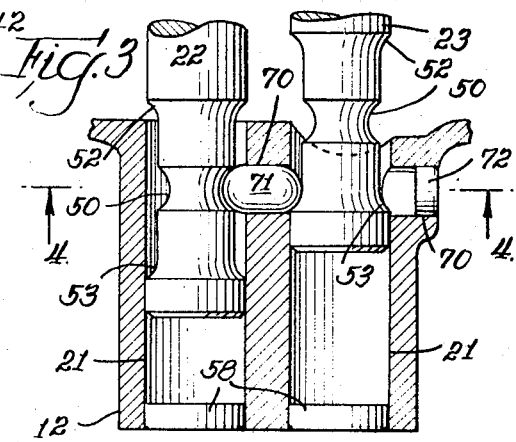
FIGURE 3 is a view similar to FIGURE 2 with one of the shift rails in a different axial position.
Figure 4:
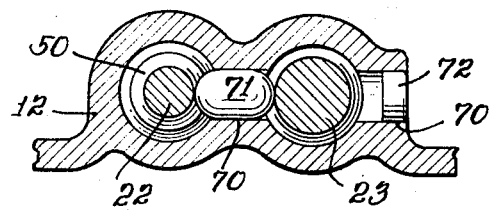
FIGURE 4 is a sectional view taken along the line 4—4 of FIGURE 3.

The novel and improved interlock and stop mechanism is illustrated in FIGURES 2 and 3. In FIGURE 2 it can be seen that provided between the bores 21 is a bore 70. Slidable within the bore 70 is a pellet 71 having semispherical end portions adapted to be engageable in the locking grooves 50 provided on shift rails 22 and 23. The bore 70 is closed by an end plug 72 inserted after assembly of pellet 71 in bore 70.

The shift rail 23 has a flat 61 formed thereon so as to allow the shift rail 23 to be assembled in the bore 21 after shift rail 22 and pellet 71 have been assembled. As viewed in FIGURE 1, the shift rail 23 is first assembled into the bore 21 and through the bore 20 as far to the left as possible, the central large diameter of the shift rail being able to pass through the bore 21 since the shift rail 22 and pellet 71 have not yet been assembled in member 12. Next, the shift rail 22 and pellet 71 are assembled in position, shift rail 23 is then moved to the right as viewed in FIGURE 1 into bore 21, the flat 61 providing clearance for the end of the shift rail 23 to pass the pellet 71. The shift rail 23 is then rotated to its proper position and end plugs 58 are assembled into the bores 21 to complete the assembly. Although other forms of construction could be used with the construction as described the flat is necessary to allow assembly of the interlock mechanism.

Referring to FIGURE 2 the shift rail 22 has just been moved from a ratio position to its neutral position and shift rail 23 is shown in the neutral position.

Referring to FIGURE 3 that shift rail 23 has been moved to a ratio position which in the structure illustrated would be 1st speed ratio and has thereby moved the pellet 71 to the left engaging the spherical end portion of the pellet with the locking groove 50 on the shift rail 22. Shift rail 22 is thus held in its neutral position and cannot move as long as the shift rail 23 is in its ratio engaging position. The shift rail 23 as illustrated in FIGURE 3 has the stop shoulder 53 engaging the pellet 71. Due to the inner engagement of the pellet 71 and the stop shoulder 53 the shift rail 23 can move no farther in its engaging direction, in other words, upwardly, as illustrated in FIGURE 3. Thus the pellet 71 is both an interlock and a stop for the shift rails 22 and 23.

From the above it will be apparent that the present invention provides a simple and improved shift lever mechanism wherein means are provided on the shift rails to perform the stop function. The interlock means comprising the pellet 71 engageable with locking grooves 50 serves both to provide the interlocking function and also to engage the stop shoulders on the shift rails to provide the stop function for the shift rails. The novel and improved shift lever mechanism is of great advantage in that no machining of the transmission cover or housing is necessary to provide stop surfaces.

Further, no machining of the shift forks is necessary. The shift forks are of a simplified design fixed to the shift rails merely by pin structures. Prior art designs of shift forks have bores therethrough receiving the shift rails since a comparatively heavy structure was required so as to provide machined surfaces to be engageable with stop surfaces in the housing.

Figure 6:
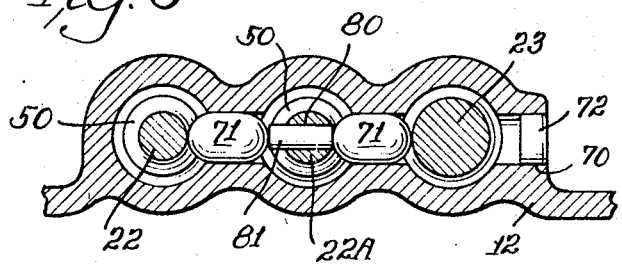
FIGURE 6 is a view taken along the line 6—6 of FIGURE 5.
Figure 5:
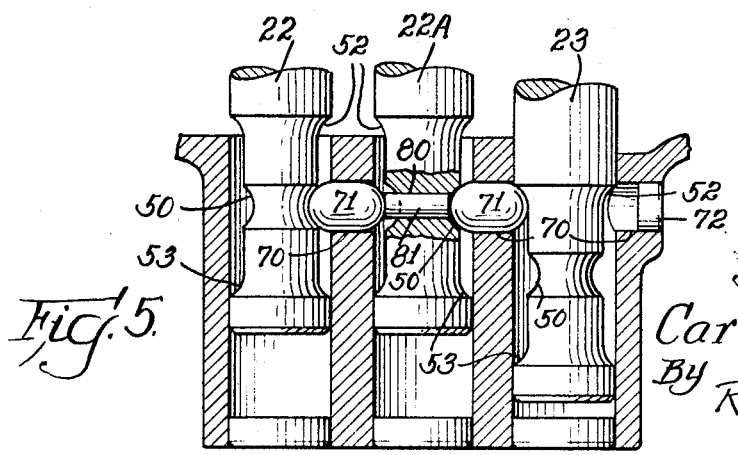
FIGURE 5 is a partial sectional view of a three-rail type shift mechanism incorporating the present invention.

Referring to FIGURES 5 and 6 there is shown an embodiment adapting the present invention for use in 4-speed transmissions or transmissions requiring three shift rails. As illustrated, there is provided shift rails 22, 23 and 22a. Provided in the center shift rail 22a is a bore 80 having a pin 81 slidable therein. In other aspects the shift rail construction is identical to that described with regard to FIGURES 2 and 3.

In the FIGURE 5 and 6 embodiment, for example as shown in FIGURE 5, the shift rail 23 has been moved downwardly to a ratio engaging position engaging the stop shoulder 52 with one of the pellets 71. The pellet 71 thus being moved to the left having the spherical portion thereon engaged in a locking groove 50 provided on the shift rail 22a. Pellet 71 also moves the pin 81 to the left thereby moving the other pellet 71 to the left so that the spherical end on the other pellet 71 will engage the locking groove 50 on the shift rail 22.

Assuming the shift rails 22 and 23 of FIGURE 5 are in the neutral position when the shift rail 22a is moved to a ratio position, each of the pellets 71 will be moved outwardly to engage the locking groove 50 of each of the shift rails 22 and 23. The middle shift rail 22a also is provided with stop shoulders 52 and 53 similar to the shift rails 22 and 23.

From the above it will be apparent that in the embodiment of FIGURES 5 and 6 the improved shift lever mechanism is easily adapted to three shift rail type structures normally utilized in 4-speed transmissions and multispeed truck transmissions and provides a simple and economical way of providing the stops to limit the axial movement of the shift rails.

Various of the features of the invention have been particularly shown and described; however, it should be obvious to one skilled in the art that various modifications may be made therein without departing from the scope of the invention.

What is claimed is:

1. In a transmission mechanism including a housing, a plurality of shift rails mounted for axial sliding movement in said housing and including at least one engaging means mounted on each said shift rail, said engaging means being axially movable with said rails to establish gear ratios in said transmission mechanism, interlock means mounted between said shift rails, a groove in each shift rail engageable by said interlock means whereby when one of said rails is moved to establish a gear ratio said interlock means will be moved to engage the groove on said other rail to prevent said other rail from axial movement, stop means on each of said rails, said stop means being engageable with said interlock means to prevent axial movement of said rails after a predetermined movement whereby said interlock means provides both as an interlock and a stop for said rails.

2. A transmission mechanism as claimed in claim 1 wherein said interlock means comprises an element slidably mounted between said shift rails having a shape complementary to said grooves whereby said element may engage said grooves 3. A transmission mechanism as claimed in claim 1 wherein said stop means comprises a pair of stop shoulders formed on each of said rails on either side of said groove.

4. A transmission mechanism including a housing, a plurality of shift rails mounted for axial sliding movement in said housing, each of said shift rails having a neutral position and at least one gear ratio establishing position, interlock means mounted between said shift rails, a locking groove in each shift rail engageable by said interlock means whereby one of said rails is moved to a ratio position said interlock means will be moved to engage the locking groove on said other rail to retain said other rail in its neutral position, stop means on each of said rails, said stop means being engageable with said interlock means to prevent axial movement of said rails after a predetermined movement whereby said interlock means is both an interlock and a stop for said rails.

5. A transmission as claimed in claim 4 wherein said interlock means comprises a pellet slidable in a bore between said rails having a spherical end portion thereon conforming to the shape of said grooves.

6. A transmission as claimed in claim 4 wherein said stop means comprises a pair of shoulders formed on said rails on either side of said grooves.

7. A transmission as claimed in claim 6 including a detent mechanism operative to yieldably retain said rails in their respective positions.

8. A transmission mechanism as claimed in claim 4 including a shift fork mounted on each of said rails for axial movement with said rails, said shift forks adapted to establish gear ratios within said transmission, said rails having bores therethrough receiving pins formed on said shift forks and thereby securing said shift forks to said rails.

References Cited

UNITED STATES PATENTS

| | | | |
|---|---|---|---|
| 3,283,298 | 11/1966 | Kaiser | 74—477 X |
| 3,292,451 | 12/1966 | Jacklin et al. | 74—477 |
| 3,301,078 | 1/1967 | Michael | 74—477 X |
| 3,354,741 | 11/1967 | Johnson et al. | 74—477 |

LEONARD H. GERIN, *Primary Examiner.*